Patented Jan. 22, 1924.

1,481,610

UNITED STATES PATENT OFFICE.

FRANK KOPERSKI, OF BAY CITY, MICHIGAN, ASSIGNOR OF ONE-HALF TO JOSEPH A. PACYNSKI, OF BAY CITY, MICHIGAN.

PROCESS FOR FINISHING WOOD.

No Drawing.   Application filed February 4, 1922. Serial No. 534,279.

*To all whom it may concern:*

Be it known that I, FRANK KOPERSKI, a citizen of the United States of America, and a resident of Bay City, in the county of Bay and State of Michigan, have invented certain new and useful Improvements in a Process for Finishing Wood, of which the following is a specification.

This invention relates to graining and finishing materials.

One object of the invention is to provide a finishing material which can be applied in the ordinary manner, and which can be mixed to produce colors to harmonize with the articles to which it is applied.

Another object is to provide a finishing material which can be very easily mixed, and in which the certain particles are not dissolved, so that they will enter and collect in the pores and grain of the wood or other material, thereby producing a very pleasing graining effect.

With the above and other ends in view, my invention consists in the preparing and applying of a base or filler coat which is shellacked and sandpapered and over which I apply a mixture of gold, silver, or copper dust, or a similar substance mixed with linseed oil or a similar compound. This mixture I make of a thick consistency and apply by dipping a soft cloth in it and then rubbing thoroughly into the pores and grain of the wood, after which I apply a coat of varnish as a protective medium to hold it securely in place.

This of course is only applicable to wood or materials having pores therein, into which the dust may enter and collect, but it will be understood that artificial means may be devised for forming pores in other material.

I also wish to direct attention to the fact that the dust can be used without mixing it with linseed boiled oil or other liquids, as it can be applied to a cloth in its dry state and then thoroughly rubbed into the material.

In practise I find that this finish will wear equally well with any of the well known finishes now on the market and can be colored as desired by varying the color of the dust or other solid substance, or the changing of the color of the filler coat or base will also change the color of the finished product.

From the foregoing description it will be obvious that I have perfected a very economical and distinctive graining and finishing process.

What I claim is:—

1. A process for graining wood or other material which consists in applying a filler coat, then applying shellac, rubbing thoroughly, next applying a mixture of metal dust and varnish, and covering with a coat of transparent protective medium.

2. A process for finishing wood or other material having pores therein, which consists in applying a filler coat, then applying shellac and sand papering the surface, next applying a mixture of metal dust and varnish, and covering this with a coating of a transparent protective medium.

In testimony whereof I affix my signature

FRANK KOPERSKI.